United States Patent

Moraw et al.

[11] 3,970,357
[45] July 20, 1976

[54] APPARATUS FOR HOLOGRAPHIC RECORDING

[75] Inventors: Roland Moraw; Günther Schädlich, both of Naurod; Klaus Horn, Hochst, all of Germany

[73] Assignee: Hoechst Aktiengesellschaft, Frankfurt am Main, Germany

[22] Filed: Oct. 31, 1974

[21] Appl. No.: 519,585

[30] Foreign Application Priority Data
Nov. 5, 1973   Germany............................ 2355136

[52] U.S. Cl. ................................................. 350/3.5
[51] Int. Cl.² .......................................... G03H 1/28
[58] Field of Search .......... 350/3.5, 162 SF, DIG. 2, 350/6, 7, 160 R, 161 R, 171; 178/7.6

[56] References Cited
UNITED STATES PATENTS

| | | | |
|---|---|---|---|
| 3,560,071 | 2/1971 | Silverman et al. | 350/3.5 |
| 3,660,818 | 5/1972 | Amodei et al. | 350/3.5 |
| 3,774,986 | 11/1973 | Bourgoin et al. | 350/3.5 |
| 3,821,722 | 6/1974 | Ost | 350/3.5 |
| 3,843,260 | 10/1974 | Edmonds | 350/3.5 |

OTHER PUBLICATIONS
Tao, IBM Tech. Dis. Doc., vol. 11, No. 7, Dec., 1968, pp. 734–735.
Grobin et al., IBM Tech. Dis. Doc., vol. 10, No. 3, Aug. 1967, pp. 282–283.
Redman, Jo. of Sci. Instr. (J. of Physics E), 1968, Series 2, vol. 1, Aug. 1968, pp. 821–822.

*Primary Examiner*—Ronald J. Stern
*Assistant Examiner*—Jon W. Henry
*Attorney, Agent, or Firm*—Bacon & Thomas

[57] ABSTRACT

Disclosed are a method and apparatus for holographically recording a plurality of holograms on a recording material. The method comprises producing two coherent light beams, altering one of these beams by an information bearing object, causing the changed beam to interfere with the other beam at an angle on the recording material, whereby the interference diagram is recorded, repeating these steps for further pieces of information with a changed recording characteristic obtained by altering the spacial arrangement of the two beams striking the recording material relative to a straight line stationary in the recording material by redirecting at least one beam with stationary optical elements.

18 Claims, 5 Drawing Figures

APPARATUS FOR HOLOGRAPHIC RECORDING

BACKGROUND OF THE INVENTION

The present invention relates to holographic recording and more especially to a method and apparatus for holographically recording a plurality of holograms upon the same position of a recording material.

In known methods for recording several holograms on top of each other, the recording of the holograms is carried out at different azimuth angles. The azimuth angle is defined as being the angle between the plane defined jointly by the reference beam and the object beam, and a straight line which is stationary on the recording material.

There are two possibilities for changing the azimuth angle when making recordings on top of each other, i.e., changing it with respect to one and the same recording material. The simplest possibility is to rotate the recording material through the azimuth angle desired. This rotation is carried out around a straight line which is at a right angle with the recording material. Alternatively, it is also possible to fix the recording material and rotate the optical elements. Finally, there is the possibility of fixing the recording material and the light source, and then rotating the beam splitter of a known recording apparatus.

German Offenlegunsschrift No. 2,253,413 relates to a device and a method for recording of several holograms on top of each other while the azimuth angle is changed. In the disclosed method the rotation of the polarization direction is kept constant by means of circular polarizers so that, because of the strength of the reflection which depends on the polarization direction, no recording differences occur.

These methods and devices for the superposition of holograms by changing the azimuth angle have a common disadvantage. All these methods require mechanical movement of either the optical elements or the recording material. Due to this mechanical movement, both the access time and the change-over time from one azimuth angle to another are very long, and therefore the application of this recording technique is unsuitable for all the problems which require the change-over to be as quick as possible.

SUMMARY OF THE INVENTION

It is therefore an object of the present invention to provide an improved method for recording a plurality of holograms at a single position on a recording material.

Another object of the invention resides in the provision of an apparatus for carrying out the improved method.

It is a particular object of the invention to provide a method of the above-described type wherein superimposed holographic recordings are made by changing the azimuth angle, which method minimizes the time necessary for changing over from one recording state to the other, particularly from one azimuth angle to another.

In accomplishing these and other objects, there has been provided in accordance with the present invention a method for recording a plurality of holograms at a single position on a recording material comprising the steps of (a) producing two coherent light beams; (b) directing one of the beams to an object bearing information to be recorded thereby altering the beam; (c) directing the altered beam from the object to the recording material; (d) directing the other beam to the recording material at an angle with respect to the altered beam, whereby the two beams interfere causing an interference diagram and this diagram is recorded on the recording material; (e) altering the spatial arrangement of the interfering light beams with respect to a stationary straight line on the recording material by redirecting at least one of the beams with optical means which are stationary with respect to the recording material; and (f) repeating the steps (a) through (d) for different pieces of information to be recorded.

Preferably the beam is redirected in step (e) by deflecting it in a divergent direction with respect to the other beam by means of a stationary beam deflector and by thereafter deflecting the redirected beam with a further stationary optical element in a direction convergent with respect to the other beam. Thus, by chosing different beam deflection directions, the beam may be made to converage with the other beam at different azimuth angles. The azimuth angle is the angle between the plane defined by the two interfering light beams and the stationary straight line on the recording material. Preferably, the light beams are laser light beams and the two beams are produced by splitting a single laser beam.

Preferably also, the recording material is a thermoplastic photoconductive material, and the method further comprises the steps of steadily electrostatically charging the recording material before recording, exposing the material to the interference image, whereby the material is provided with a charge image corresponding to the interference image, and then developing the material. The developing step comprises heating the material until the charge pattern shows a corresponding deformation pattern and then cooling the material, whereby the deformation pattern solidifies.

Thus the main feature of the method according to the invention is that by means of known beam deflector devices partial beams of the laser are directed in predetermined diverging directions and that by means of fixed optical deflection devices these partial beams, which run, one after the other, in divergent directions, are deflected in such a manner that they converge at the place of interference. Because of the azimuth rotation, the deflected and the non-deflected beam form a plane, this plane forming for each deflection direction a different azimuth angle with a straight line stationary on the recording material.

In accordance with the invention it is preferred to use as recording material a thermoplastic photoconductive film which has a wide exposure range. Particularly successful has been a film with an electrically conductive base. This film comprises polyvinyl carbazole activated by means of 1,3,7-trinitro fluorenone, the molar ratio between the monomer units of the polyvinyl carbazole and the trinitro fluorenone preferably being about 10:1. This photoconductive layer is covered with a thermoplastic layer of, for example, a hydrogenated colophony ester. It is also possible to use polystyrene containing copper phthalocyanine as a binder. The molecular weight of the polystyrene is preferably about 20,000 to 30,000.

There is also provided according to the present invention an apparatus for carrying out the method. The apparatus comprises a means for providing first and second light beams; means positioned in the optical path of the first beam for deflecting the first beam in a plurality of directions divergent to the second beam, preferably an acousto-optical deflector; means, preferably a first optical element, positioned with respect to the first beam for directing the first beam, for each of the deflected divergent directions, in a direction convergent with the second beam, whereby the first and second beams converge at the same place on the recording material at a different azimuth angle for each divergent direction of the first beam, and means for positioning information to be recorded in the optical path of the second beam. Preferably the means for providing the first and second light beams comprises a laser light beam source and means for splitting the beam from the source into two coherent partial beams.

The apparatus preferably further comprises between the deflector and the first optical element a second optical element for further divergently directing the first beam subsequent to deflection by the deflector. Third and fourth optical elements for directing the second light beam along the longitudinal axis of the deflecting means are also provided, as well as means for holding the recording material at a right angle with respect to the longitudinal axis of the deflecting means and means for holding an object bearing information to be recorded in the path of the second beam along this longitudinal axis.

In a further embodiment of the invention the size and arrangement of the reflector planes of the first and second optical elements are selected in relation to one another in such a manner that each discrete image area of the recording material can be reached by the first beam at different azimuth angles by changing the direction of deflection of the first beam in the respective reflector planes of the first and second optical elements. In this embodiment there is also included means for permitting the second light beam to strike the entire area of the recording material simultaneously.

Other objects, features and advantages of the present invention will become apparent from the following detailed description of several specific embodiments of the invention, when considered with the accompanying drawings.

DETAILED DESCRIPTION OF PREFERRED EMBODIMENTS

Figure 1A:
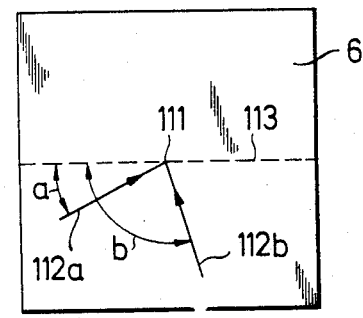
FIGS. 1a and 1b are schematic diagrams from two views, illustrating the azimuth angle.
Figure 1B:
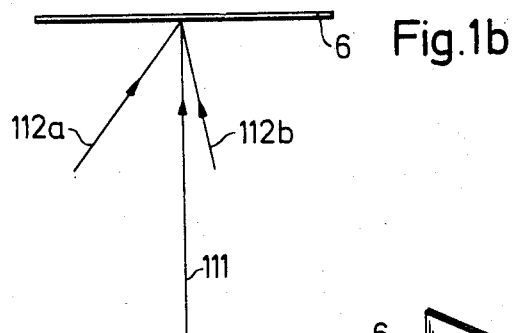

Referring now to FIG. 1, there is diagrammatically shown in plan view and in front view a recording material which is holographically imaged in one and the same place from two different azimuth directions. The object beam, the direction of which is not changed, is marked by reference numeral 111. The one reference beam irradiated at the azimuth angle $a$ is marked 112$a$, and the other reference beam irradiated at the azimuth angle $b$ is marked 112$b$. Each of the two beams 112$a$ and 112$b$ forms a plane together with the object beam 111, and each of these planes form, together with a reference line 113 stationary in the recording material 6, respective angles $a$ and $b$. These angles $a$ and $b$ are called azimuth angles.

Figure 2:
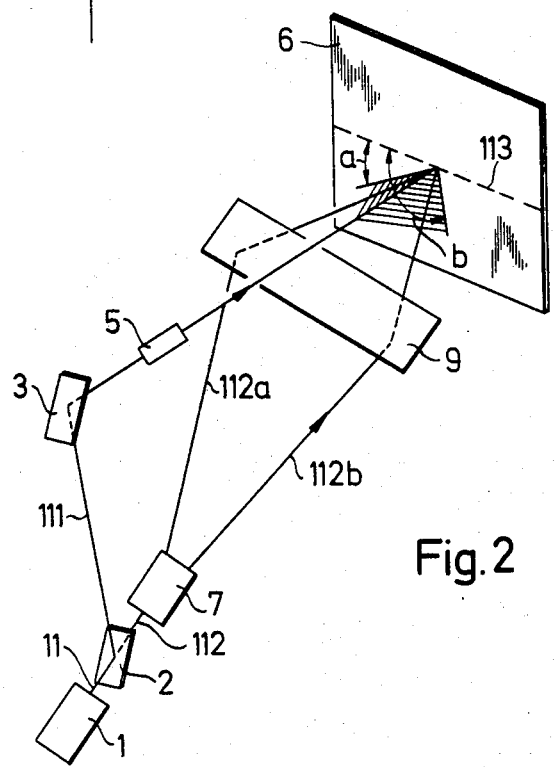
FIG. 2 is a schematic representation of an apparatus for carrying out of the method according to the invention.

If no object 5 is present to alter the beam 111, two bands of parallel straight lines are produced as interference pattern on the recording material, which bands form together the angle $b - a$. If the beam 111 is directed vertically onto the recording material and the angles between the beam 111 and the beams 112$a$ and 112$b$ are equal, the undisturbed lines of interference on the recording material 6 are also equidistant. In cases of dissymmetry, the distances between the lines of interference may differ, a fact however, which does not change the basic concept of the invention. With reference now to FIG. 2, the principle of the method according to the invention will now be explained.

By means of the laser 1 the laser beam 11 is produced which is divided by a beam splitter 2, for example a semitransparent mirror, into two partial beams 111 and 112. The beam 111 is deflected by means of a mirror 3 and, after picking-up the information to be recorded at the object 5, for example, a plate with transparent and non-transparent areas, altered beam 111 impinges on the recording material 6. The other partial beam enters a known beam deflector 7, for example an acousto-optical beam deflector. By means of this beam deflector 7, the partial laser beam 112 can be deflected into several diverging directions without mechanically moved parts. Two of these diverging directions are indicated by the beams 112$a$ and 112$b$. The reference number 9 generally indicates a deflection device which optically deflects the diverging beams 112$a$ and 112$b$ and causes them to converge with the partial beam 111 at the place of interference on the recording material 6. This deflector 9 may be a mirror, a refracting element, a diffracting element or combined optical elements, for example, an element capable of refracting and reflecting at the same time.

According to the invention, an arrangement of the optical elements is preferred in which one beam has a fixed direction and is preferably directed at a right angle onto the recording material, whereas the other beam strikes the recording material at different selected azimuth angles, these different angles preferably forming a cone-shaped shell. If the nondeflected object beam is not directed vertically onto the recording material, the local frequency range, i.e., the distance between the undisturbed lines of interference, is also changed by the azimuth rotation. A preferred embodiment of the arrangement according to the invention is illustrated in FIG. 3.

Figure 3:
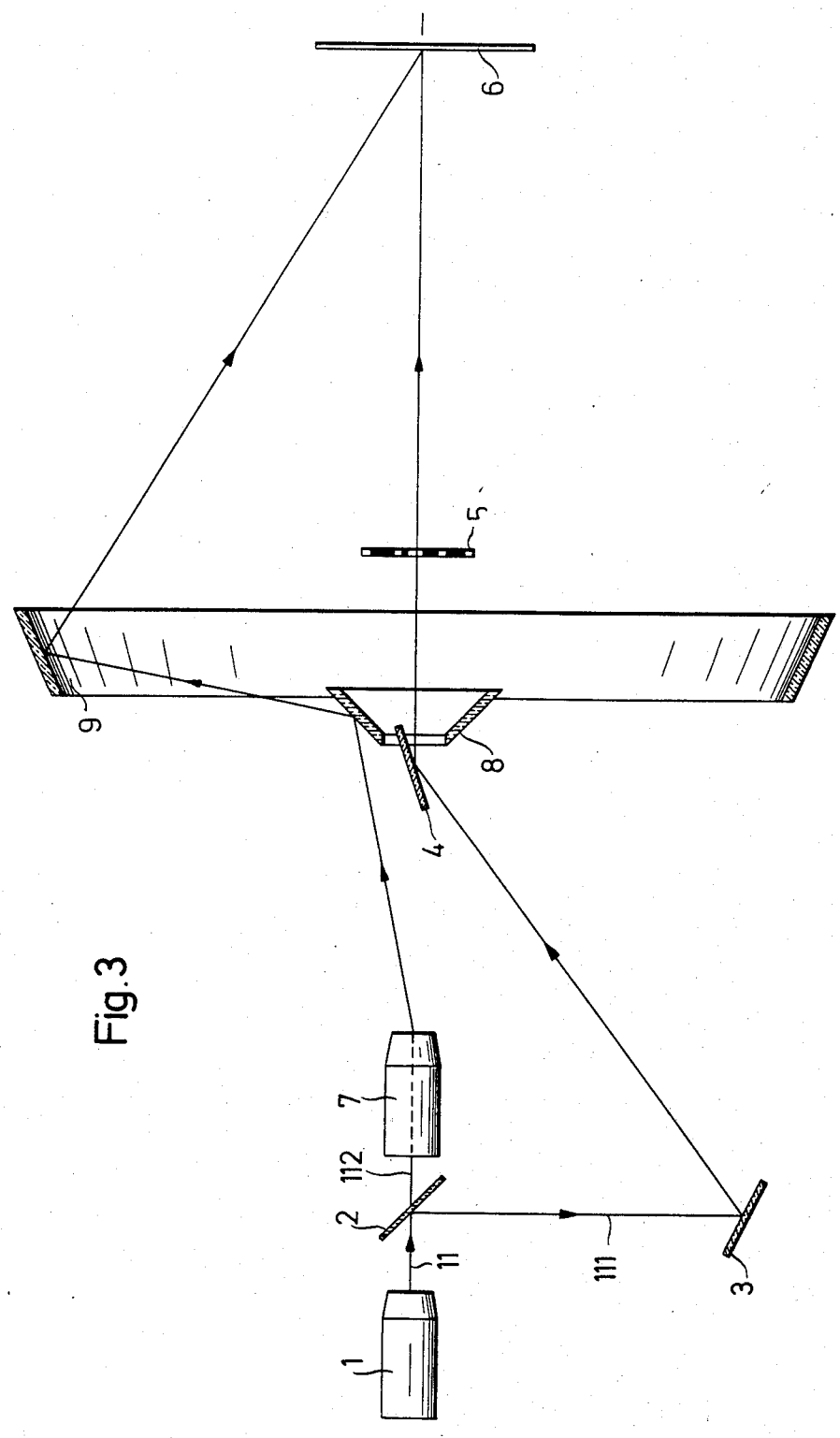
FIG. 3 illustrates a side view of a preferred embodiment of a holographic recording apparatus having a symmetrical construction.

In FIG. 3, the light of the laser 1 is split by the beam splitter 2. The beam 111, called object beam in the following description, strikes the recording material at a right angle via the mirrors 3 and 4, thus penetrating the object 5, which is at least partially transparent. This beam forms, after being reflected by the mirror 4, the optical axis of the rotationally symmetrical arrangement beyond the mirror 4. This axis preferably coincides with the longitudinal axis of the beam deflector 7. The other beam 112, hereinafter called the reference beam, is deflected with two direction changes by the beam deflector 7, via an outer conical mirror 8 and an inner conical mirror 9, onto the recording material 6, where both beams interfere and record a hologram. The mirror 9 may also be a cylindrical mirror, i.e., a special conical mirror with the apex at infinity. In order to shorten the adjusting time, the beam deflector 7 should not work mechanically in the sense that mirrors are moved. According to the invention, known controllable beam deflectors are provided, e.g., those which work according to the acousto-optical principle. Depending on the position of the reference beam 112 on a circular path on the outer conical mirror 8, controlled by the beam deflector 7, both beams 111 and 112 interfere at different angles relative to the fixed recording material. The envelope of all reference beams is part of and circumscribes a cone-shaped shell. The spatial orientation of the different mirror elements is described by means of the surface normals. The surface normals designate the direction vertical to the reflection plane. In the case of a convex mirror this is the direction vertical to the tangent plane.

A complete rotation of the azimuth angle through 360° is not necessary, because after 180°, the settings of the elements are comparable. The number of intermediate settings between 0° and 180° depends in the last analysis on the accuracy of the positioning of the beam deflector. Such beam deflectors are available on the market.

The arrangement in FIG. 3 furthermore illustrates two advantageous details of the arrangements. The mirrors 3 and 4 make possible an adaptation of the path lengths of the object and reference beams. The arrangement of the object 5 in the partial beam 111, referred to as the object beam, is not necessary but is very advantageous, because in this case reconstruction is always possible in a direction vertical to the recording material, independent of the special azimuth setting. The conical mirror 8 and the mirror 4, too, may be replaced, for example, by a body of glass cut in a corresponding conical form, the front surfaces of which are prismatically cut in such a way that the object beam is directed vertically onto the recording material 6. The beam splitter, the mirrors and such glass bodies are collectively called mirror or optical elements.

Figure 4:
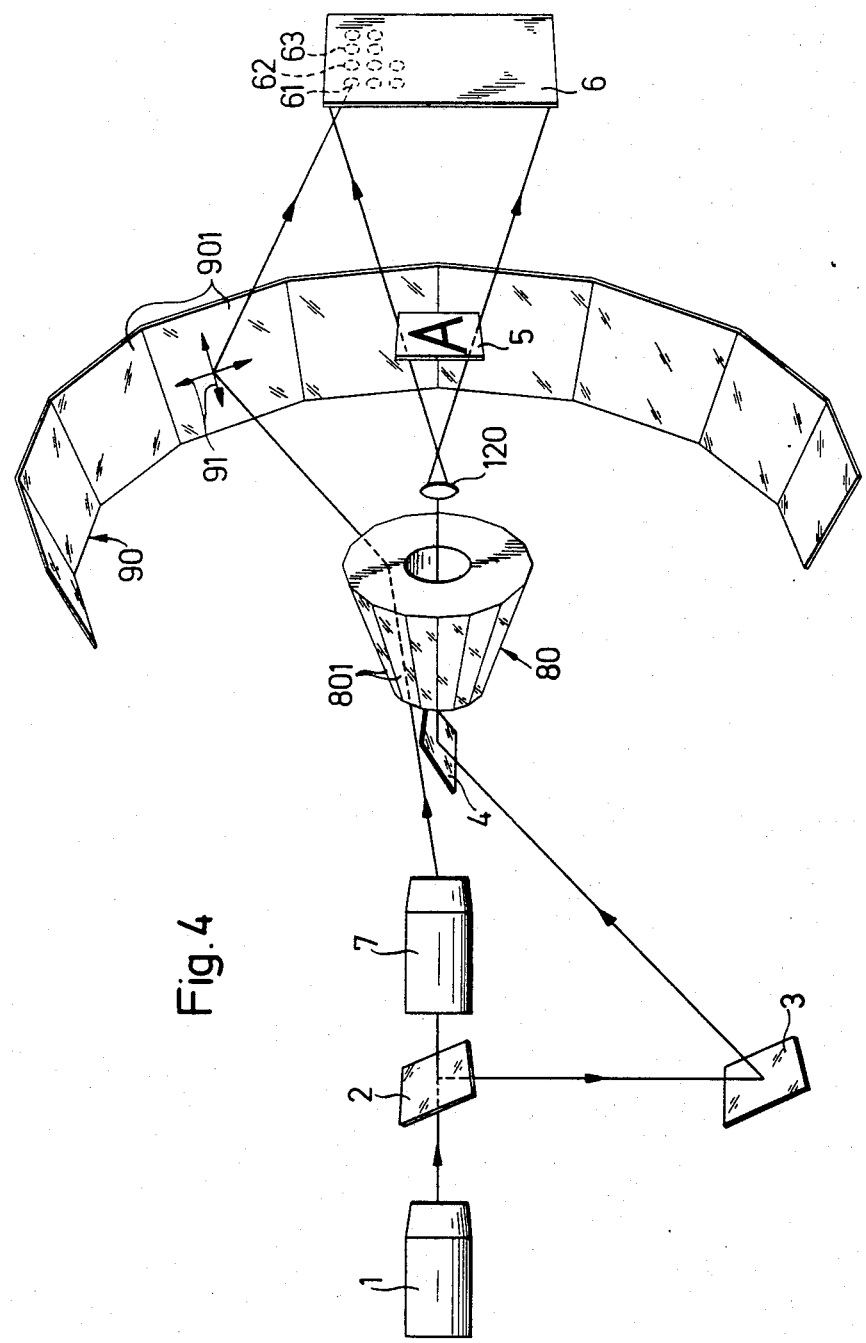
FIG. 4 is a schematic view, in perspective, of an apparatus of the invention, also having a symmetrical construction and suitable for use in recording several multiple holograms on one recording carrier.

Apart from limitations of the beam diameter, the recording of the holograms is always carried out at the same place on the recording material by superimposing the different holograms. While maintaining the present construction in principle, however, by means of certain changes it is also possible, to carry out the recordings, which may overlap, at different azimuth angles at any given place on the recording material, whereby the amount of storable information is considerably increased. Such a more extensive embodiment is illustrated in FIG. 4. The elements correspond to those of FIG. 3, except for the following changes.

In FIG. 4, the outer conical mirror 8 of FIG. 3 is replaced by a bored faceted or beveled mirror 80 with plane mirror surfaces 801. The inner conical mirror 9 in FIG. 3 is replaced by a corresponding faceted or beveled mirror 90 with plane mirror surfaces 901. Although it is true that this arrangement renders possible only so many different azimuth angles as there are mirror pairs 801/901, on the other hand it is possible, by means of relatively small deflections of the reference beam in the sense of the crossed double arrows 91 on the mirror 90, to precisely image all of the areas 61, 62, 63 etc. of the recording material 6. Therefore it is advisable to fan-out or magnify the fixed object beam by means of an optical element 120 in such a manner that its aperture angle covers the entire recording area on the recording material 6. The principle is not changed if, for example, the faceted mirror 90, the cross section of which is a closed polygon, is opened up into a corresponding system having mirrors, the cross-section of it being shaped like a discontinuous or shifted polygon. In connection with the apparatus illustrated in FIG. 4, a special advantage of the use of thermoplastic photoconductors should be pointed out.

Whereas a silver film is also blackened by the non-holographic illumination of the respective areas 61, 62, 63 etc., on which recording of the hologram has not yet been carried out (i.e., the areas which the reference beam has not yet reached), the discharge of these areas on thermoplastic photoconductors can be eliminated by recharging them. Unlike silver film, the thermoplastic photoconductor can be made sensitive again after illumination. If a superposition of holographic and non-holographic recordings is to be avoided, a conventional diffusing screen may be used in front of the object so that, at a sufficiently far distance, there is not produced a clear shadow figure of the object on the recording material, but instead a diffuse spot, which becomes a holographic image only by means of the reference beam.

The arrangements of FIGS. 3 and 4 are applicable to the carrier frequency method with directly readable pictures in such a manner that an imaging optical device is interposed between the original and the recording material. The image reproduction is carried out according to the usual projection, a procedure during which the image may be rotated through the azimuth angle given before the start of the recording and can be impinged at an angle corresponding to the reference angle of the spacing of the interference lines.

The recording of superimposed images as a result of changing the azimuth angle is thus not limited to holograms, but is also applicable to directly readable images. The most essential advantage of the method and the apparatus according to the invention is the fact that mechanical movements of structural elements are avoided. About one hundred recordings in one and the same area of the recording material are possible. The construction of recording apparatus is particularly simplified by the invention because, as a consequence of the fixed recording material, there are avoided normally existing problems concerning supply lines, for example, with thermoplastic photoconductor films. For the thermoplastic photoconductor layers are either directly, or on a film used as a carrier, applied to a glass plate having an electrically conductive transparent layer. The conductive layer serves as a counter electrode during the charging. By means of exposure to light, of several exposures to light according to the invention, a latent charge image is produced. For the development of a phase hologram by means of relief formation the glass plate is heated, the conductive layer serving as a heating layer. The relief image is fixed by cooling it off. By means of renewed intensive heating the relief image can be discharged. The recording technique with thermoplastic photoconductor layers may also be applied in such a manner that an additional relief image is produced over already existing relief images by means of charging, exposing to light, heating, and cooling off.

What is claimed is:

1. Apparatus for recording a plurality of holographic images upon the same region of a recording medium comprising:

a. a coherent radiant energy source, b. means for directing a radiation beam from said source along an optical axis of said apparatus, c. beam splitting means positioned on said optical axis for producing a reference beam along said optical axis and a mutually coherent object beam off of said optical axis, d. deflection means positioned on said optical axis for receiving said reference beam from said beam splitting means, and for deflecting said reference beam in a direction divergent with respect to said optical axis, e. first reflecting means having a longitudinal symmetry axis substantially coincident with said optical axis and having an outer reflecting surface for reflecting said reference beam from said deflection means in a direction divergent with respect to said optical axis, f. second reflecting means having an inner reflecting surface for reflecting said reference beam from said first reflecting means in a direction convergent with respect to said optical axis, said reference beam thereby impinging on said recording medium, g. means for reflecting said object beam from an off-axis direction to a direction substantially along said optical axis and extending beyond said first and second reflecting means to an object to be recorded, whereby said object beam is altered by said object and said altered object beam and said reference beam interfere at the same region of said recording medium.

2. Apparatus as recited in claim 1 wherein said deflection means is an X-Y deflector.

3. Apparatus as recited in claim 2 wherein said X-Y deflector is an acoustical-optical deflector.

4. Apparatus as recited in claim 1 wherein said outer reflecting surface of said first reflecting means is a conical surface and said first reflecting means has a bore along the longitudinal symmetry axis thereof, said object beam passing along said optical axis, through said bore.

5. Apparatus as recited in claim 4 wherein said second reflecting means has a longitudinal symmetry axis substantially coincident with said optical axis and said inner reflecting surface of said second reflecting means is a conical surface and said second reflecting means has an aperture along the longitudinal symmetry axis thereof, said object beam passing along said optical axis through said aperture.

6. Apparatus as recited in claim 1 wherein said outer reflecting surface of said first reflecting means is a multi-faceted surface.

7. Apparatus as recited in claim 6 wherein said inner reflecting surface of said second reflecting means is a multi-faceted surface.

8. Apparatus as recited in claim 7 wherein said multi-faceted surfaces are set in relation to one another in such a manner that partial image areas of the recording medium can be reached by said reference beam at a predetermined azimuth angle by changing the direction of deflection of said reference beam in a respective related surface of said multi-faceted surfaces of said outer and inner reflecting surfaces, and each one of the partial image areas is reached at a different azimuth angle by changing the deflection of said reference beam in another related surface of said outer and inner reflecting surfaces, said azimuth angle being the angle between the plane defined by the interfering reference and objects beams and a stationary straight line on said recording medium.

9. Apparatus as recited in claim 8 further comprising means for expanding the object beam to strike the entire area of the recording medium simultaneously.

10. Apparatus as recited in claim 1 wherein said radiant energy source is a laser.

11. Apparatus as recited in claim 1 wherein said deflection means deflects said reference beam in an arc about said outer reflecting surface whereby said altered object beam and said reference beam interfere at the same region of said recording medium at a different azimuth angle for each divergent direction of said reference beam, said azimuth angle being the angle between the plane defined by the interfering reference and objects beams and a stationary straight line on said recording medium.

12. Apparatus as recited in claim 11 wherein said deflection means deflects said reference beam in a circle about said outer reflecting surface whereby said reference beam circumscribes a cone on said recording medium.

13. Apparatus for recording a plurality of holographic images upon the same region of a recording medium comprising:

a. a coherent radiant energy source, b. means for directing a radiation beam from said source along an optical axis of said apparatus, c. beam splitting means positioned on said optical axis for producing a reference beam along said optical axis and a mutually coherent object beam off of said optical axis, d. deflection means positioned on said optical axis to receive said reference beam from said beam splitting means for selectively deflecting said reference beam in any one of a plurality of directions divergent with respect to said optical axis, e. reflecting means having a longitudinal symmetry axis substantially coincident with said optical axis for reflecting said reference beam from said deflection means in a convergent direction with respect to said optical axis, said reference beam impinging on said recording medium, and f. means for reflecting said object beam from an off-axis direction to a direction substantially along said optical axis, and extending beyond said reflecting means to an object to be recorded, whereby said object beam is altered by said object and said altered object beam and said reference beam interfere at a region of said recording medium.

14. Apparatus as recited in claim 13 wherein said reflecting means comprises a truncated cone having an axis of rotation along said optical axis.

15. Apparatus as recited in claim 13 wherein said reflecting means comprises a plurality of reflecting surfaces.

16. Apparatus as recited in claim 13 further comprising an additional reflecting means disposed between said deflection means and said reflecting means for providing an additional divergent reflection of said reference beam with respect to said optical axis.

17. Apparatus as recited in claim 13 wherein said non-mechanical deflection means comprises an acoustical-optical deflector.

18. Apparatus as recited in claim 13 wherein said object beam is altered by passing through said object.

* * * * *